US006653435B1

(12) United States Patent
Aoki et al.

(10) Patent No.: US 6,653,435 B1
(45) Date of Patent: *Nov. 25, 2003

(54) NONLINEAR CRYSTALLINE POLYESTER

(75) Inventors: Katsutoshi Aoki, Wakayama (JP);
Takashi Yamaguchi, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/671,682

(22) Filed: Sep. 28, 2000

(30) Foreign Application Priority Data

Sep. 28, 1999 (JP) ............................ 11-275016

(51) Int. Cl.[7] ........................ C08G 63/12; C08G 63/16; C08G 63/52

(52) U.S. Cl. ........................ 528/296; 528/302; 528/303; 528/306; 430/109.4

(58) Field of Search ................. 528/296, 302, 528/303, 306; 430/109.4

(56) References Cited

U.S. PATENT DOCUMENTS

| | | | | |
|---|---|---|---|---|
| 3,067,179 A | * | 12/1962 | Frey | 528/296 |
| 4,332,767 A | * | 6/1982 | Kitanaka et al. | 264/322 |
| 4,481,351 A | | 11/1984 | McConnell et al. | |
| 4,849,495 A | * | 7/1989 | Funato et al. | |
| 4,975,513 A | | 12/1990 | Kim et al. | |
| 5,015,724 A | * | 5/1991 | Kawabe | 528/296 |
| 5,115,004 A | * | 5/1992 | Mochizuki et al. | 524/318 |
| 5,276,127 A | * | 1/1994 | Takyu et al. | 528/296 |
| 5,639,560 A | * | 6/1997 | Moens et al. | 525/10 |
| 6,018,004 A | | 1/2000 | Warzelhan et al. | 525/440 |
| 6,080,824 A | * | 6/2000 | Tung et al. | 525/439 |
| 6,114,042 A | | 9/2000 | Warzelhan et al. | 428/422.8 |
| 6,201,034 B1 | | 3/2001 | Warzelhan et al. | 521/138 |
| 6,303,677 B1 | | 10/2001 | Warzelhan et al. | 524/291 |
| 6,339,115 B1 | * | 1/2002 | Aoki et al. | 523/513 |

FOREIGN PATENT DOCUMENTS

| | | |
|---|---|---|
| DE | 100 42 927 A | 3/2001 |
| EP | 0 291 059 A2 | 11/1988 |
| EP | 0 495 476 A | 7/1992 |
| EP | 1 102 127 A2 | 5/2001 |
| EP | 1 107 069 A1 | 6/2001 |
| EP | 1 126 324 A1 | 8/2001 |
| EP | 1 126 325 A1 | 8/2001 |
| EP | 1 186 622 A2 | 3/2002 |
| FR | 2 197 920 A | 3/1974 |
| GB | 1373220 | 11/1974 |
| JP | 500 75043 | 5/1975 |
| JP | 50075043 | 5/1975 |
| JP | 49129540 A | 9/1976 |
| JP | 491 29540 A | 9/1976 |
| JP | 52 057282 A | 5/1977 |
| JP | 500 87032 | 6/1977 |
| JP | 50087032 | 6/1977 |
| JP | 560 65146 A | 6/1981 |
| JP | 56065146 A | 6/1981 |
| JP | 56 099044 A | 8/1981 |
| JP | 622 76565 A | 1/1987 |
| JP | 62276565 A | 1/1987 |
| JP | 04 120555 A | 4/1992 |
| JP | 08 036274 A | 2/1996 |
| JP | 09329917 A | 12/1997 |
| JP | 093 29917 A | 12/1997 |
| JP | 29 31899 B | 5/1999 |
| JP | 2931899 B | 5/1999 |
| JP | 11249339 A | 9/1999 |
| JP | 112 49339 A | 9/1999 |
| WO | WO 96/15173 A1 | 5/1996 |
| WO | WO 01/63366 A1 | 8/2001 |

* cited by examiner

Primary Examiner—Peter Szekely
(74) Attorney, Agent, or Firm—Birch, Stewart, Kolasch & Birch, LLP

(57) ABSTRACT

A nonlinear crystalline polyester obtained by polycondensing monomers containing trivalent or higher polyvalent monomers selected from the group consisting of trihydric or higher polyhydric alcohols and tricarboxylic or higher polycarboxylic acid compounds in an amount of from 0.1 to 20 mol % of all monomers used for polycondensation.

9 Claims, No Drawings

NONLINEAR CRYSTALLINE POLYESTER

BACKGROUND OF THE INVENTION

1. Field of the Invention

The present invention relates to a nonlinear crystalline polyester which is used as a resin binder for a toner used for developing electrostatic latent images formed in electrophotography, electrostatic recording method, electrostatic printing, and the like, and a base material for mold materials used in core materials for automobile interior materials, silencers for air conditioners, fiber-reinforced plastics, soundproofing plates for construction materials, and the like.

2. Discussion of the Related Art

There have been known that a crystalline resin is suitably used as a resin binder for toner (Japanese Examined Patent Publication No. Sho 62-39428 and Japanese Patent Laid-Open Nos. Sho 62-276565 and Hei 9-329917). However, presently known crystalline resins are each found to be a linear polymer from its raw material monomers, so that there has not yet been reported a polyester which is nonlinear and crystalline.

An object of the present invention is to provide a nonlinear crystalline polyester having excellent fixing ability and appropriate strength when used as a resin binder for a toner for electrophotography, and a base material for mold materials.

The above object and other objects of the present invention will be apparent from the following description.

SUMMARY OF THE INVENTION

The present invention pertains to a nonlinear crystalline polyester obtained by polycondensing monomers containing trivalent or higher polyvalent monomers selected from the group consisting of trihydric or higher polyhydric alcohols and tricarboxylic or higher polycarboxylic acid compounds in an amount of from 0.1 to 20 mol % of all monomers used for polycondensation.

DETAILED DESCRIPTION OF THE INVENTION

The nonlinear crystalline polyester of the present invention is prepared by using monomers containing an alcohol component comprising a dihydric alcohol and/or a trihydric or higher polyhydric alcohol, and a carboxylic acid component comprising a dicarboxylic acid compound and/or a tricarboxylic or higher polycarboxylic acid compound.

The dihydric alcohol components include ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, and the like, among which from the viewpoints of the softening point and the crystallinity of the resin, 1,4-butanediol, ethylene glycol, 1,2-propylene glycol, and 1,6-hexanediol are preferable, and 1,4-butanediol is more preferable. Especially, it is desirable that 1,4-butanediol constitutes preferably 80 mol % or more, more preferably from 90 to 100 mol %, of the alcohol component.

The trihydric or higher polyhydric alcohols include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxymethylbenzene, and the like, among which glycerol is preferable from the viewpoints of the softening point and the crystallinity of the resin.

In addition, examples of the dicarboxylic acid compounds include maleic acid, fumaric acid, citraconic acid, itaconic acid, glutaconic acid, phthalic acid, isophthalic acid, terephthalic acid, cyclohexanedicarboxylic acid, succinic acid, adipic acid, sebacic acid, azelaic acid, and malonic acid; succinic acids substituted by an alkyl group having 1 to 20 carbon atoms or an alkenyl group having 2 to 20 carbon atoms, such as dodecenylsuccinic acid and octylsuccinic acid; acid anhydrides thereof, alkyl (1 to 3 carbon atoms) esters thereof, and the like, among which from the viewpoints of the softening point and the crystallinity of the resin, fumaric acid, succinic acid and adipic acid are preferable, and fumaric acid is more preferable. Especially, it is desirable that fumaric acid constitutes preferably 80 mol % or more, more preferably from 85 to 100 mol %, of the carboxylic acid component.

Examples of the tricarboxylic or higher polycarboxylic acid compound include 1,2,4-benzenetricarboxylic acid (trimellific acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, Empol trimer acid, acid anhydrides thereof, alkyl (1 to 3 carbon atoms) esters thereof, and the like, among which from the viewpoints of the softening point and the crystallinity of the resin, trimellitic acid and derivatives thereof are preferable, and trimellitic acid anhydride is more preferable.

In the present invention, in order to form a nonlinear polyester, monomers contain trivalent or higher polyvalent monomers selected from the group consisting of trihydric or higher polyhydric alcohols and tricarboxylic or higher polycarboxylic acid compounds in an amount of from 0.1 to 20 mol %, preferably from 0.5 to 15 mol %, more preferably from 1 to 13 mol %, of all monomers used for polycondensation.

The polycondensation of the alcohol component with the carboxylic acid component can be carried out, for instance, by the reaction at a temperature of from 150° to 250° C. in an inert gas atmosphere, using an esterification catalyst and a polymerization inhibitor as occasion demands. Concretely, in order to enhance the strength of the resin, the entire monomers may be charged at once. Alternatively, in order to reduce the low-molecular weight components, divalent monomers are firstly reacted, and thereafter trivalent or higher polyvalent monomers are added and reacted.

One of the great features of the polyester obtainable by the polycondensation of the above monomers resides in that the polyester is nonlinear and crystalline. In other words, the polyester of the present invention is nonlinear, thereby exhibiting excellent strength, and is crystalline, thereby exhibiting excellent fixing ability when the polyester is used as a resin binder for toners or a base material for mold materials. Therefore, the polyester of the present invention can be suitably used for toners for electrophotography, molding materials, and the like.

In the present invention, the term "nonlinear" may take any non-linear structure, including branched structures and cross-linked structures. Also, the term "crystalline" means that a $T_a/T_b$ ratio, each as defined as follows, is from 0.9 to 1.1, preferably from 0.98 to 1.05. Here, in the present invention, $T_a$ refers to a temperature corresponding to ½ of the height (h) of the S-shaped curve showing the relationship between the downward movement of a plunger (flow length) and temperature, namely, a temperature at which a half of the resin flows out, when measured by using a flow tester of the "koka" type ("CFT-500D," manufactured by Shimadzu Corporation) in which a 1 g sample is extruded through a nozzle having a dice pore size of 1 mm and a length of 1 mm, while heating the sample so as to raise the temperature at a rate of 6° C./min and applying a load of 1.96 MPa thereto with the plunger, which is also called a softening point. Also, $T_b$ refers to the temperature of an intersection of the extension of the baseline of not more than the maximum endothermic peak temperature and the tangential line showing the maximum inclination between the kickoff of the peak and the top of curves as determined with a sample using a differential scanning calorimeter ("DSC Model 210," manufactured by Seiko Instruments, Inc.), when the sample is treated by raising its temperature to 200° C., cooling the hot sample at a cooling rate of 10° C./min. to 0° C., and thereafter heating the sample so as to raise the temperature at a rate of 10° C./min.

In consideration of its use as a resin binder for toners, and the like, the polyester of the present invention has $T_a$, namely the softening point, of preferably from 85° to 140° C., more preferably from 100° to 140° C., and $T_b$ of preferably from 77° to 150° C., more preferably from 90° to 140° C.

In consideration of its use as a resin binder for toners, and the like, the nonlinear crystalline polyester has a number-average molecular weight of tetrahydrofuran-soluble component of preferably from 500 to 3000.

EXAMPLES

[$T_a$]

$T_a$ refers to a temperature corresponding to ½ of the height (h) of the S-shaped curve showing the relationship between the downward movement of a plunger (flow length) and temperature, namely, a temperature at which a half of the resin flows out, when measured by using a flow tester of the "koka" type ("CFT-500D," manufactured by Shimadzu Corporation) in which a 1 g sample is extruded through a nozzle having a dice pore size of 1 mm and a length of 1 mm, while heating the sample so as to raise the temperature at a rate of 6° C./min and applying a load of 1.96 MPa thereto with the plunger.

[$T_b$]

$T_b$ refers to the temperature of an intersection of the extension of the baseline of not more than the maximum endothermic peak temperature and the tangential line showing the maximum inclination between the kickoff of the peak and the top of curves as determined with a sample using a differential scanning calorimeter ("DSC Model 210," manufactured by Seiko Instruments, Inc.), when the sample is treated by raising its temperature to 200° C., cooling the hot sample at a cooling rate of 10° C./min. to 0° C., and thereafter heating the sample so as to raise the temperature at a rate of 10° C./min.

[Number-Average Molecular Weight of Tetrahydrofuran-Soluble Component]

The number-average molecular weight is determined by using gel permeation chromatography (sample concentration: 0.5% by weight; eluent: tetrahydrofuran; flow rate: 1 ml/min.; temperature: 40° C.; column: GMHLX/G3000HXL (manufactured by Tosoh Corporation); standard sample: monodisperse polystyrene). Here, as a sample one which is prepared by placing 40 mg of resin powder and 10 ml of tetrahydrofuran in a 20-ml sample tube, stirring the mixture with a ball-mill at room temperature for 3 hours, and thereafter filtering the resulting mixture with a membrane filter (manufactured by Toyo Roshi K.K., 0.2 μm pore diameter) is used.

Examples 1 to 8

A 5-liter four-necked flask equipped with a nitrogen inlet tube, a dehydration tube, a stirrer, and a thermocouple was charged with raw materials shown in Table 1, and the ingredients were reacted at 160° C. for 5 hours. Thereafter, the temperature was raised to 200° C. and reacted for 1 hour, and further reacted at 8.3 kPa for 1 hour, to give a nonlinear crystalline polyester. $T_a$, $T_b$, and the number-average molecular weight of tetrahydrofuran-soluble component of each of the resulting nonlinear crystalline polyesters are shown in Table 1.

TABLE 1

|  | Example 1 | Example 2 | Example 3 | Example 4 | Example 5 | Example 6 | Example 7 | Example 8 |
| --- | --- | --- | --- | --- | --- | --- | --- | --- |
| 1,4-Butanediol | 25 moles | 25 moles | 25 moles | 23.75 moles | 22.5 moles | 25 moles | 23.75 moles | 23.75 moles |
| Ethylene Glycol |  |  |  | 1.25 moles | 2.5 moles |  |  |  |
| 1,6-Hexanediol |  |  |  |  |  |  |  | 1.25 moles |
| Glycerol |  |  |  |  |  |  | 1.25 moles |  |
| Fumaric Acid | 23.75 moles | 22.5 moles | 21.25 moles | 23.75 moles | 23.75 moles | 22.5 moles | 25.75 moles | 23.75 moles |
| Succinic Acid |  |  |  |  |  | 1.25 moles |  |  |
| Trimellitic Acid Anhydride | 1.65 moles | 2.5 moles | 5 moles | 1.65 moles | 1.65 moles | 1.65 moles |  | 1.65 moles |
| Hydroquinone (Polymerization Inhibitor) | 5.3 g | 5.3 g | 5.7 g | 5.3 g | 5.3 g | 5.3 g | 5.2 g | 5.2 g |
| $T_a$ (° C.) | 127.3 | 123.5 | 104.0 | 131.1 | 114.3 | 115.7 | 128.8 | 130.8 |
| $T_b$ (° C.) | 123.0 | 120.4 | 99.9 | 127.1 | 110.8 | 115.8 | 125.8 | 125.2 |
| $T_a/T_b$ | 1.03 | 1.03 | 1.04 | 1.03 | 1.03 | 1.00 | 1.02 | 1.04 |
| Number-Average Molecular Weight of Tetrahydrofuran-Soluble Component | 705 | 625 | 635 | 535 | 951 | 676 | 599 | 765 |

Test Example 1

There were mixed together 100 parts by weight of each of the polyesters obtained in Examples 1 to 8 as the resin binder, 4 parts by weight of a colorant "MONARCH 880" (manufactured by Cabot Corporation), and 1.5 parts by weight of a charge control agent "T-77" (manufactured by Hodogaya Chemical Co., Ltd.) with a Henschel mixer. Thereafter, the mixture was melt-kneaded with a twin-screw extruder, pulverized and classified, to give a powder having a weight-average particle size of 11 μm. To 100 parts by weight of the resulting powder was added 0.5 parts by weight of a hydrophobic silica "R-972" (manufactured by Nippon Aerosil), and mixed with a Henschel mixer, to give a toner.

The resulting toner was loaded on a modified apparatus of a commercially available copy machine "AR-S330" (manufactured by Sharp Corporation) to develop images. As a result, excellent fixed images could be obtained.

According to the present invention, there can be provided a nonlinear crystalline polyester having excellent fixing ability and appropriate strength when used as a resin binder used for toners for electrophotography, and a base material for mold materials.

What is claimed is:

1. A nonlinear crystalline polyester obtained by polycondensing monomers comprising (1) polyhydric alcohols, and (2) polycarboxylic acids, wherein monomers which are at least trivalent comprise from 0.1 to 20 mol. % of all monomers used for polycondensation, and wherein fumaric acid is present as a monomer in an amount of at least 80 mol % based on the total amount of polycarboxylic acids present.

2. The nonlinear crystalline polyester according to claim 1, wherein said alcohol component (1) comprises 1,4-butane diol in an amount of 80 mol % or more of said alcohol component (1).

3. The nonlinear crystalline polyester according to claim 1, wherein said polyvalent monomer is selected from the group consisting of at least one of trimellitic anhydride and glycerol.

4. The nonlinear crystalline polyester according to claim 1, wherein the nonlinear crystalline polyester has a softening point of from 85° C. to 140° C., a number-average molecular weight of tetrahydrofuran-soluble component of from 500 to 3000.

5. The nonlinear crystalline polyester according to claim 1, wherein said monomers which are at least trivalent comprise from 0.5 to 15 mol. % of all monomers used for polycondensation.

6. The nonlinear crystalline polyester according to claim 1, wherein said monomers which are at least trivalent comprise from 1 to 13 mol. % of all monomers used for polycondensation.

7. The nonlinear crystalline polyester according to claim 1, wherein said polyester has a softening point of from 100 to 140° C.

8. The nonlinear crystalline polyester according to claim 1, wherein said polyester has a number-average molecular weight of from 500 to 3000.

9. The nonlinear crystalline polyester according to claim 1, wherein said fumaric acid is present as a monomer in an amount ranging from 85 to 100 mol % based on the total amount of polycarboxylic acids present.

* * * * *